Figure 1:
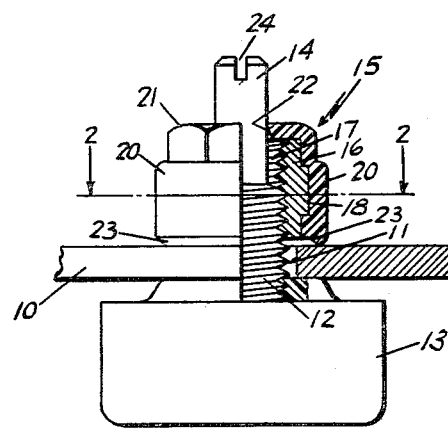

Sept. 30, 1958  N. F. DAMON  2,854,099

SHAFT LOCKS AND SEALS

Filed May 25, 1956

INVENTOR
NEIL F. DAMON
BY Elmer J. Gorn
ATTORNEY

United States Patent Office 2,854,099
Patented Sept. 30, 1958

2,854,099

SHAFT LOCKS AND SEALS

Neil F. Damon, Weston, Mass., assignor to Raytheon Manufacturing Company, Waltham, Mass., a corporation of Delaware Application May 25, 1956, Serial No. 587,346

4 Claims. (Cl. 188—83)

This invention relates to a shaft lock and seal, and more particularly to the type in which the device supplies a constant wiping drag on the shaft that is tight enough to hold the shaft stationary under shock and vibration but not so tight as to prohibit adjustment.

The shafts of adjustable components of electrical, electronic and other equipment require easy adjustment but must be held firmly in the new position once adjusted. Normally this is done by the use of some device that must be loosened by one tool before the adjustment can be made and then is adjusted by another tool and finally tightened up again by the first tool. Such devices thus require three operations for one adjustment. These operations require two tools. This is quite time consuming and in many situations rapid adjustment may be very important. Any attempt to make the shaft fit tightly in the bushing makes for a critical adjustment in manufacture, as too tight to fit will make adjustment difficult, and too loose a fit will permit the equipment to get out of adjustment too easily during use.

These difficulties are avoided in the construction of the invention by the use of a metal threaded insert fitted in a plastic molded housing. The outer end of the housing is formed as a nut or with other means for rotary driving and an opening for the outer end of the shaft that is initially smaller than the shaft. The threaded insert has threads on the inside that fit the threads on the bushing surrounding the shaft and attached to the adjustable component. The outside of the threaded insert is preferably formed as a nut or otherwise in a manner to assure its moving with the plastic housing. The outer end of the opening in the outer end of the housing is formed with a smaller diameter than the inner end of this part of the opening. If a sealing action is desired, the lower end of the plastic housing may be formed with an annular protrusion making a fluid-tight contact with the panel when the lock is tightened up.

In mounting, the lock is slipped over the outer end of the shaft and driven inward toward the panel until the threads of the insert engage the threads of the bushing. It is then screwed tight up against the panel. The outer end of the housing exerts a constant wiping drag on the shaft as it is turned, which is sufficient to prevent accidental turning of the shaft, but not sufficient to prevent turning the shaft in the usual manner to adjust the component.

Figure 2:
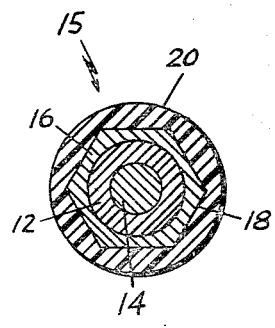

Other and further advantages of this invention will be apparent as the description thereof progresses, reference being had to the accompanying drawing in which:

Fig. 1 is a side view of a representative lock of the invention as attached to an adjustable component mounted on a panel; and Fig. 2 is a section taken along the line 2—2 of Fig. 1.

In Fig. 1 the reference numeral 10 designates a panel having an opening 11 in which is inserted the threaded bushing 12 of an adjustable component 13, such as a potentiometer. The shaft 14 of the component 13 protrudes through the bushing 12. A lock, designated generally by the numeral 15, fits about the shaft 14 and is threaded onto the bushing 12 to hold the component 13 in position. The lock 15 is formed with a metal insert 16 having a central axial threaded opening 17 that fits on the threaded bushing 12 attached to the component 13. The outside of the insert 16 is formed as a hexagonal nut 18, or otherwise formed to prevent relative movement with the housing 20 in which it is inserted or which is formed about it. This housing is preferably of elastic plastic material, such as nylon. The outer end 21 of the housing 20 is shaped as a nut or otherwise formed to be turned by a tool and is formed with an axial opening 22. This opening has an inside diameter less than the outside diameter of a shaft 14 so as to form a forced fit with it. The opening is preferably formed with a taper so that it has a smaller diameter at the outside. The inside end surface of the housing 20 is formed with an annular protrusion 23 that flows under pressure to form a fluid-tight seal with the panel 10. The shaft is formed with a notch 24 to receive a screw driver blade or otherwise fitted to be turned for adjustment.

In operation, after the component is positioned with the bushing 12 and shaft 14 projecting from the opening 11 in the panel 10, the lock 15 is placed over the end of the shaft 14 and driven inwards onto it by means of a socket wrench, or other suitable tool, so that the shaft 14 is driven through the opening 22 of the outer end 21 of the lock 15. The outer portion of the opening 22 exerts a wiping drag against the shaft whenever it starts to turn. The taper aids in the insertion process to give a wedge action in forcing the shaft 14 through the opening 22. When the thread 17 on the insert 16 engages the threads on the bushing 12, the wrench is turned to tighten the lock and secure the component. As the lock is forced against the panel 10, the annular protrusion 23 cold-flows against the panel, forming a fluid-tight seal.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A shaft lock adapted to create a constant wiping drag when mounted on a first smooth portion of a shaft which also has a smooth portion which is rotatably mounted in an externally threaded bushing, said lock comprising a substantially rigid plastic housing with an axial opening smaller at one end than at the other, with the opening at the smaller end bevelled and of a diameter sufficiently smaller than that of said first smooth shaft portion it is adapted to receive to form a force fit with it, a metallic insert fitting within the larger portion of the opening in the housing and being internally threaded to receive threadedly said externally threaded bushing, said housing at the larger end having a tapered annular projection beyond the plane of the metallic insert.

2. A shaft lock adapted to create a constant wiping drag when mounted on a first smooth portion of a shaft which also has a smooth portion which is rotatably mounted in an externally threaded bushing, said lock comprising a substantially rigid plastic housing with an axial opening smaller at one end than at the other, with the opening at the smaller end bevelled and of a diameter sufficiently smaller than that of said first smooth shaft portion it is adapted to receive to form a force fit with it, the outer surface of the smaller end of said housing being shaped in the form of a polygon to act as a nut, a metallic insert fitting within the larger portion of the opening in the housing and being internally threaded to receive threadedly said externally threaded bushing, said housing at the larger end having a tapered annular projection beyond the plane of the metallic insert.

3. A shaft lock adapted to create a constant wiping drag when mounted on a first smooth portion of a shaft which also has a smooth portion which is rotatably mounted in an externally threaded bushing, said lock comprising a substantially rigid plastic housing with an axial opening smaller at one end than at the other, with the opening at the smaller end bevelled and of a diameter sufficiently smaller than that of said first smooth shaft portion it is adapted to receive to form a force fit with it, the outer surface of the smaller end of said housing being shaped in the form of a polygon to act as a nut, a metallic insert fitting within the larger portion of the opening in the housing and being internally threaded to receive threadedly said externally threaded bushing, at least a portion of the external body of said insert being shaped in the form of a polygon at the surface thereof which fits within said housing, said housing at the larger end having a tapered annular projection beyond the plane of the metallic insert.

4. A shaft lock and mounting arrangement for a panel-mounted rotatably adjustable component comprising, in combination, an adjustable component, said component including a shaft which has a smooth portion which is rotatably carried in an externally threaded bushing of said component, said shaft having a further smooth portion which extends outwardly beyond said bushing, a shaft lock mounted on said further smooth shaft portion to create a constant wiping drag thereon, said lock comprising a substantially rigid plastic housing with an axial opening smaller at one end than at the other, with the opening at the smaller end bevelled and of a diameter sufficiently smaller than that of said further smooth shaft portion before assembly thereon to form a force fit with after assembly, a metallic insert fitting within the larger portion of the opening in the shaft lock housing and having internal threads engaging said externally threaded component bushing, said housing at the larger end having a tapered annular projection beyond the plane of the metallic insert.

References Cited in the file of this patent

UNITED STATES PATENTS

| | | |
|---|---|---|
| 1,603,556 | Platt et al. | Oct. 19, 1926 |
| 2,294,686 | Newman | Sept. 1, 1942 |
| 2,401,824 | Gladden et al. | June 11, 1946 |
| 2,425,104 | Luce | Aug. 5, 1947 |
| 2,509,058 | Haury | May 23, 1950 |
| 2,786,359 | Karlan et al. | Mar. 26, 1957 |
| 2,795,144 | Morse | June 11, 1957 |